UNITED STATES PATENT OFFICE.

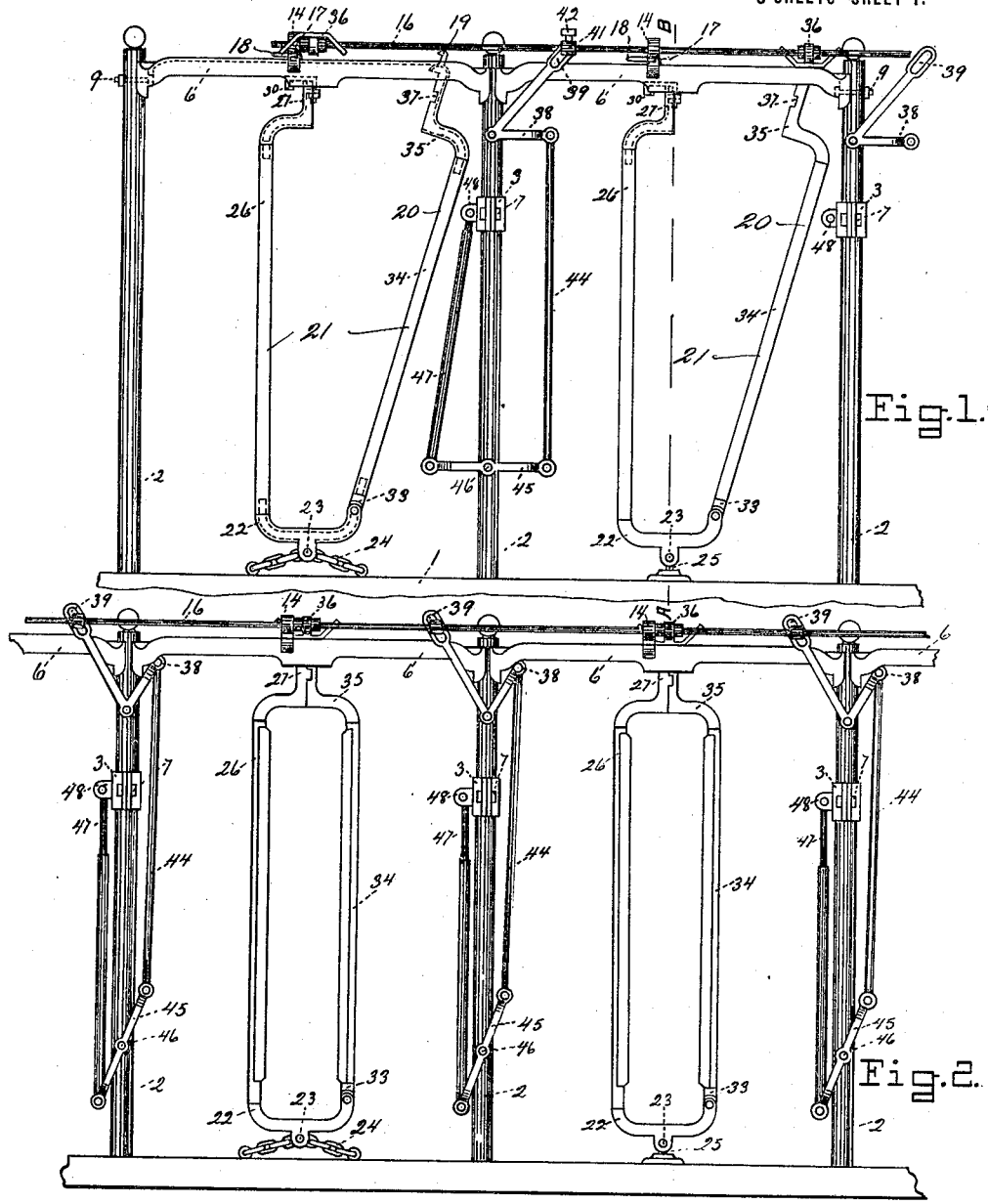

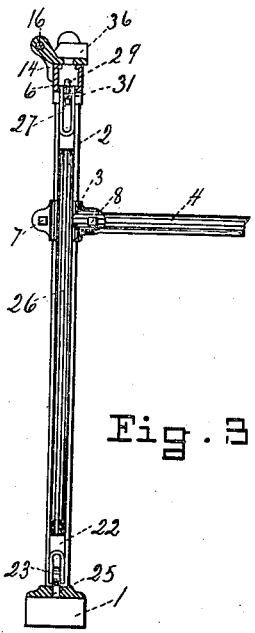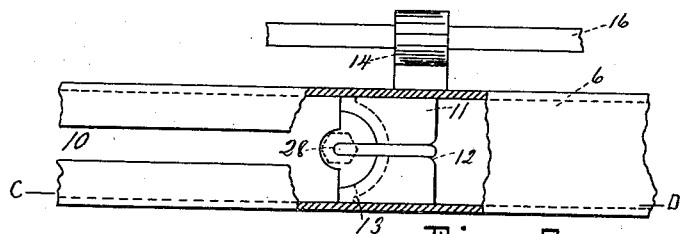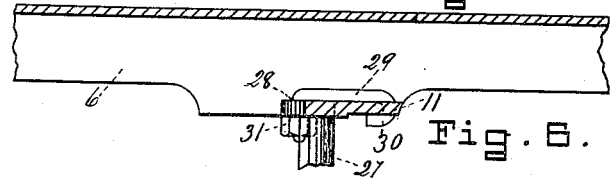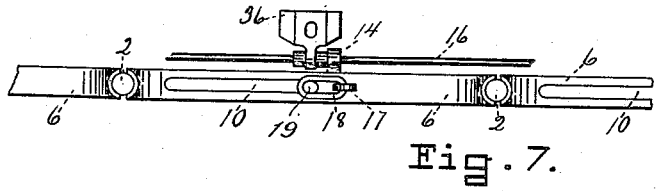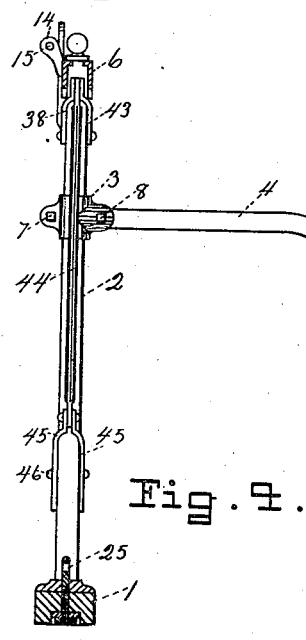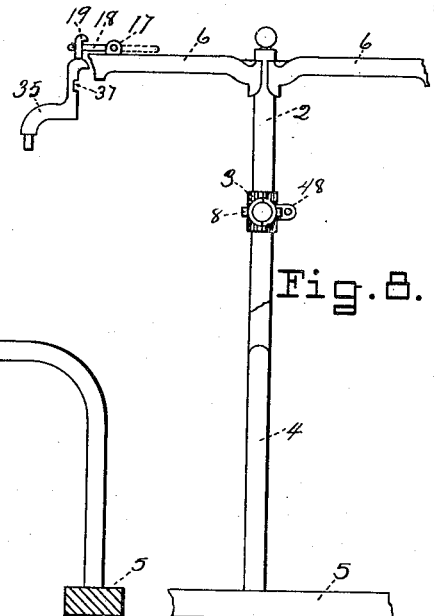

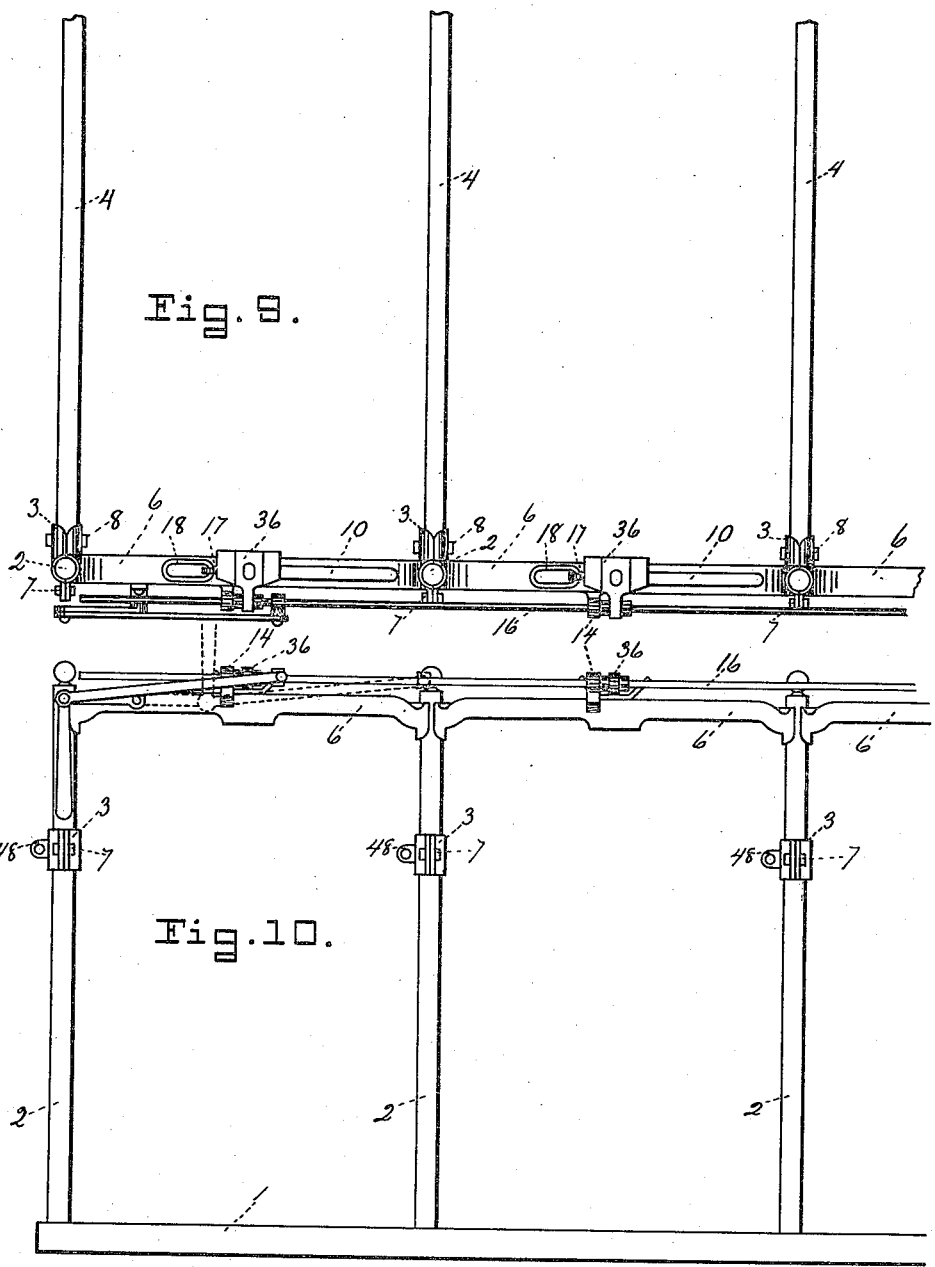

HERMAN BARSNESS AND EDWIN SAMUEL BARSNESS, OF BLACK EARTH, WISCONSIN.

CATTLE-STANCHION.

1,138,616.  Specification of Letters Patent.  Patented May 11, 1915.

Application filed July 23, 1914. Serial No. 852,710.

*To all whom it may concern:*

Be it known that we, HERMAN BARSNESS and EDWIN SAMUEL BARSNESS, citizens of the United States, residing at Black Earth, in the county of Dane and State of Wisconsin, have invented certain new and useful Improvements in Cattle-Stanchions, of which the following is a specification.

Our invention relates to improvements in cattle stanchions in which one animal can be secured or released at a time or a whole row can be similarly handled, and the objects of my invention are to provide an arrangement which can be erected singly or in series and one that provides an automatic stop on both sides of the retaining bow preventing cattle from putting their heads through any but the right aperture in the stanchion thus eliminating any loss of time in securing cattle in their stalls. We attain the above objects by the mechanism illustrated in the accompanying drawings, in which—

Figure 1 is a front elevation of two sections open and the cattle stop in operative position, Fig. 2 is a front elevation of two sections with bows and stops closed, Fig. 3 is a vertical section on line A—B, Fig. 1, with parts removed, Fig. 4 is a similar view showing cattle stop raised, Fig. 5 is a plan of the top plate or girder with central portion in section, Fig. 6 is a vertical longitudinal section on line C—D, Fig. 5; Fig. 7 is plan of the top plate or girder, actuating rod, hasp and locking link, Fig. 8 is a rear elevation of one post, portions of girders etc. Fig. 9 is a plan of a series of stanchions and opening and closing rod and connections, and Fig. 10 is a front elevation of a series of stanchions and opening and closing devices.

Similar numerals refer to similar parts throughout the several views.

The front sill 1, the posts 2, the connections 3, the stall partitions 4, the rear sills 5, and the girders 6, form the frame work of my device. The posts 2, are preferably sections of gas pipe of the desired length located in holes spaced in the front sill 1. On the posts intermediate the central and upper ends is disposed the connection 3, comprising two malleable iron plates with a flat plate at one end and a semi-circular vertical channel intermediate the two ends, the said plates adapted to be secured together by two clamping bolts 7, and 8. The vertical channels are disposed, one on each side of the posts 2, and the semi-circular ends receive the front end of the partition 4. The flat plates are secured together by the clamping bolts 7, and the semi-circular ends secured to the partitions by the bolt 8, which passes through both plates and the pipe forming the partition. The upper ends of the posts 2 are secured together and in alinement with each other by the girder 6, which is a malleable casting with a semi-circular bearing abutting each post and secured thereto by the attaching bolts 9, which pass through apertures in the semi-circular ends of the girders 6 and alined apertures in the posts 2 adjacent the tops thereof.

The girders 6 comprise a top plate with a longitudinal slot 10 extending from the central portion to nearly one end thereof and provided with semi-circular ends adapted to fit the posts 2. There are also two depending side plates the central portion thereof extending below the general width for a distance equidistant from the center. A transverse ledge 11 extends from side to side of said girder and a notch 12 is provided in one end of the ledge and a semi-circular bearing 13 in the other end of the ledge. A bracket 14 is disposed on the front side of the girder and a hole 15 through said bracket is provided to retain and guide a rod 16. On the top of said girder a distance from the inner end 5 of the slot 10 is located a vertical lug 17, drilled to receive a link 18, said link 18 being of sufficient length to engage the neck portion 19 of the hinged side 20 of the bow 21. The function of the link 18 is to retain the hinged side 20 of the bow 21 in locked position where it is desirable to retain one or more animals in their stalls and release the balance in a series of stanchions, reference being had to Fig. 7.

The bow of my stanchion comprises a bottom member 22, of tubular cross section curved upward at both ends, the lower central portion having two depending lugs 23, adapted to be pivotally attached to either two short sections of chain 24, or a pivotally disposed eye bolt 25. Said eye bolt or chains are secured to the sill 1 of the structure. One of the upward curved ends of the member 22 terminates in a plug which is inserted in the pipe 26, which extends upward and is secured to the stationary pivotal top member 27 of the bow 22. Said member 27 is tubular throughout its curved portion and semi-tubular throughout the vertical portion. The top of the vertical portion is capped by a plate with a hole 28 through the same to admit the retaining bolt or link 29, which is provided with a hook 30 disposed in notch 12 of plate 11 and resting upon the top of the said plate extends the length thereof and downward through the hole 28, and is secured to the said member 27 by the nut 31 see Figs. 5 and 6. The hinged member 32 of bow 22 is hingedly attached to the opposite end of the bottom member by a plug 33 inserted in the lower end of a pipe 34 which extends upward to a top member 35. Said top member 35 is similar in form to member 27 and is secured to the upper end of the pipe 34, in the same manner. The vertical semi-circular portion is much longer and terminates in a round neck with a hook portion extending over the top of the member 27 when the two members are joined and the hasp 36 is in closed position.

Adjacent the top of the member 27 is disposed a lug which extends a distance past the center sufficient to receive the link 29. It is obvious that when the bows are closed this lug resting in a semi-circular recess would lock the bows against lateral movement and prevent the opening of the series by means of the lever, should one animal turn the bow out of alinement with the series of stanchion members. To prevent such an occurence a notch 37 is removed from the member 35 which permits the bows to move laterally on each other.

Our cattle stop as mentioned in the objects hereinbefore set forth in constructed and operated in the following manner. To the front upper portion of the posts 2, an arm 38 is pivotally attached. Said arm comprises a horizontal member which curves inward to approximately the center of the post from the pivot point and an upwardly extending member, forming an acute angle of approximatetly 30° with the horizontal member. In the upper end of the said upwardly extending member is formed the slot 39, adapted to engage a pin 40 extending outward from the collar 41, which is disposed on the coöperating rod 16 and secured in the desired position by a set screw 42. To the opposite side of the post 2, in alinement with the pivot point of the said arm 38, is pivotally disposed a second arm 43, coextensive with the horizontal member of arm 38. Between the outer ends of the horizontal member of arm 38 and the arm 43, is pivotally attached the upper end of member 44. The lower end of said member is pivotally secured between the ends of the duplicate levers 45, said levers being pivotally attached to each side of the lower end portion of the post 2 by a bolt 46. Between the ends of the levers, opposite the member 44, is loosely disposed a short section of gas pipe which extends upward therefrom. Into the upper end of said pipe is inserted a rod 47 in sliding engagement therewith. The upper end of the rod 47 is pivotally located between two ears 48 on connection 3. It can be readily seen that when the operating rod 16, is moved in the direction of the arrow, Fig. 1, that the loose member of the bow will be opened and simultaneously the arm 38 will move the cattle stop into the position shown in Fig. 1, and an opposite movement of the operating rod will close the bow and fold the cattle stop against the post as shown in Fig. 2. Any one animal can be released by throwing back the hasp 36, thus releasing the hinged portion of the bow. It is also obvious that one or more animals may be retained when the general series is open by disengaging the said hasp 36 and applying the link 18, see Figs. 7 and 8.

If it is desired to use the cattle stop independent of the operating rod 16, it is accomplished by loosening the set screw 42, thus disengaging the required stop from the series.

Having thus fully described our invention what we claim is—

1. In a device of the kind described, in combination with spaced uprights and a bow for securing cattle, a metal girder connecting each pair of uprights, said girder comprising a top plate, a longitudinal slot in said top plate, a lug a distance from the inner end of said slot, a link disposed in said lug, a side plate depending from each side of said top plate, a bracket extending laterally from one of the side plates adapted to support a rod in sliding engagement therewith, a shelf between said side plates at the lower edges thereof and integral therewith, and approximately intermediate their length, a notch in the rear end of said shelf, a semicircular bearing formed in the front end of said shelf the center of said bearing being the longitudinal center of said girder, semicircular vertical plates at the extreme ends of said girder adapted to be bolted to the posts as described.

2. In a device of the kind described, a combination with spaced uprights and a bow for securing cattle, a means for connecting the tops of said uprights, a rod carried in brackets attached to said top connecting means, a double arm loosely connected to said posts, one member of the arm operatively connected to said rod and moving coincident therewith, a rod connected to the other member of said arm and depending therefrom, the lower end of said rod pivotally secured between duplicate double ended arms, the said arms pivotally connected to the said post intermediate their length, a tubular member pivotally disposed between the duplicate arms opposite the rod, a rod inserted in the upper end of said tubular member in sliding contact therewith, the upper end of said rod pivotally secured between lugs integral with a connection clamped to the posts aforesaid substantially as described.

3. In a device of the kind described, in combination with spaced uprights, a means for connecting the tops of said uprights a cattle securing bow comprising side rails hingedly connected at the bottom and provided with curved upper members, one of said curved upper members provided with a lug projecting a distance beyond the center thereof to receive one end of a link, the other end of said link disposed in the slotted portion of a plate integral with said top supporting means and the other curved member provided with a notch in register with said lug to permit said bows to slide past each other at right angles to the curved portions aforementioned, a hasp disposed on a rod and adapted to secure the said cattle securing bows in closed position, as described.

In testimony whereof we affix our signatures in the presence of two subscribing witnesses.

HERMAN BARSNESS.
EDWIN SAMUEL BARSNESS.

Witnesses:
E. V. CLARK,
U. D. WOOD.